Figure 1:
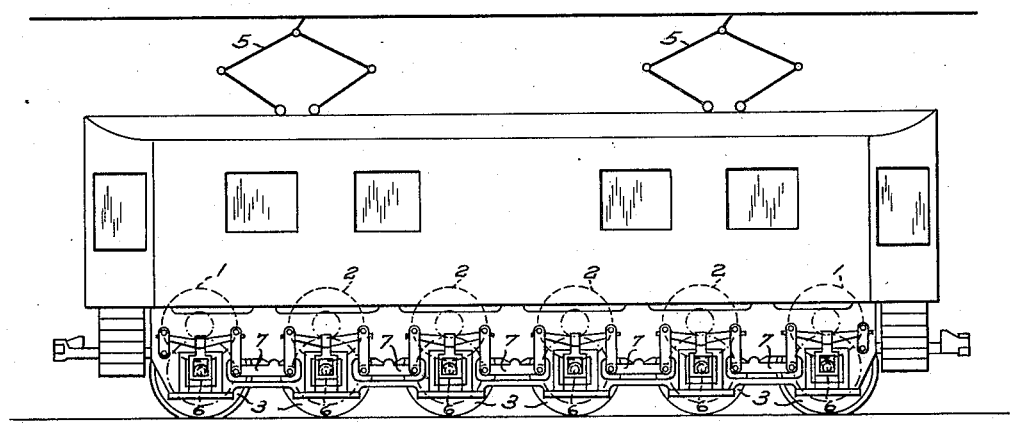

Feb. 25, 1936.  W. OERTEL  2,032,327

ELECTRIC LOCOMOTIVE WITH INDIVIDUAL AXLE DRIVE

Filed March 14, 1932

Inventor
W. Oertel
by
Attorney

Patented Feb. 25, 1936

2,032,327

UNITED STATES PATENT OFFICE 2,032,327

ELECTRIC LOCOMOTIVE WITH INDIVIDUAL AXLE DRIVE

Wilhelm Oertel, Berlin-Steglitz, Germany, assignor to Aktiengesellschaft Brown Boveri & Cie., Baden, Switzerland, a joint-stock company of Switzerland Application March 14, 1932, Serial No. 598,718
In Germany March 16, 1931

6 Claims. (Cl. 105—49)

Electric locomotives equipped with a considerable number of driving axles, such as in freight locomotives, present a number of difficulties in the construction of the mechanical parts thereof. If such locomotives are built with an axle arrangement 1CoCo1 (six driving axles with propelling motors individual thereto and two non-driven axles) and it is assumed that nose-suspended motors are used, then such locomotives must be constructed as articulated or double-truck locomotives in order that operation thereof over tracks having relatively sharp curves may be permitted. Such arrangements are, however, avoided whenever possible because of the disadvantages met with when operating these locomotives, and also because of the greater cost of the mechanical parts. There is also the possibility of building this type of locomotive with an Fo (six driving axles with propelling motors individual thereto and without guiding axles) axle grouping. In the latter arrangement all of the driving axles of the locomotive may be journaled in a single frame as far as track curves are concerned, but possesses poor running properties because of the absence of non-driving guiding axles.

In many cases it is possible, according to the invention, to improve the running properties of this type very considerably if the end driving axles are arranged to take a lower axle pressure. As a result of the smaller axle pressure on the end driving axles, locomotives of this kind behave in a similar manner to those equipped with idling or non-driving axles. Since it is usual when starting up to run the motors up to the limit of adhesion, it is necessary that the motors of both end driving axles produce smaller tractive efforts relative to the tractive efforts produced by the intermediate ones of the driving axles. This may be accomplished either by equipping the end driving axles with smaller powered motors, or when all the motors are of the same rating to supply the end motors with a lower voltage so that they exert less tractive effort. When adopting the latter method the motors driving the end axles may, nevertheless, be impressed with the full line voltage at the higher speeds where the limit of adhesion is not generally reached, so that the full capacity of the motors may be utilized.

It is, therefore, amongst the objects of the present invention to provide an axle drive for electric locomotives where all the axles are driving axles, but where the two end axles are subjected to smaller axle pressures than the remaining axles.

Another object of the invention is to provide an axle drive for electric locomotives in which driving axles only are employed whereby the operating advantages of locomotives with non-driving axles are secured without the necessity for employment of swiveling trucks or reduction of distance between axles.

Another object of the invention is to provide a locomotive having a plurality of driving axles with propelling motors individual thereto in which the motors driving the end axles are of a lower H. P. rating than the H. P. rating of the motors driving the intermediate axles or where the motors driving the end axles are impressed with a lower voltage than the motors driving the intermediate axles, at least, during starting.

Figure 2:
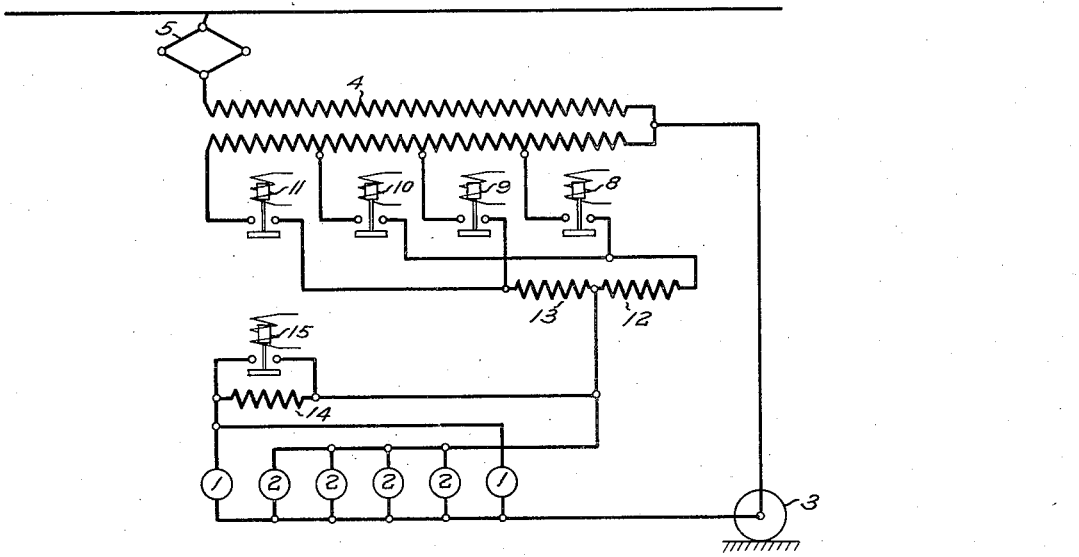

Objects and advantages other than those set forth will be apparent from the following description when read in connection with the accompanying drawing forming a portion of the present disclosure in which:

Fig. 1 is an elevational side view of an electric locomotive fitted with six driving motors, the two end motors developing a smaller tractive power than the others; and Fig. 2 is a diagram of connections where all the driving motors are of the same rating, but with the motors which drive the two end axles supplied at a lower voltage during starting.

Referring more particularly to the drawing by characters of reference, Figure 1 illustrates in outline on electric locomotive provided with six pairs of driving wheels 3 each affixed to an axle 6 journaled in a non-swiveling frame in any preferred manner, which, for the purpose of illustration, is shown as being similar to the arrangement illustrated in U. S. Patent 902,476, issued October 27, 1908, to W. Dalton, whereby, by virtue of the off center fulcruming of the two end equalizing links 7, the pressure exerted on the end axles, and therethrough to the wheels and track, are less than the pressures exerted on the intermediate axles. As indicated in the drawing, each of the axles is geared to a separate driving motor 1, 2. The motors 1, 2 may be conjointly controlled in their operation by any suitable well known controller system whereby the voltage applied to the respective motors may be automatically, or manually, varied in dependence upon predetermined load and speed factors within the limits of the adhesion.

In the embodiment according to Fig. 1, of the drawing, the H. P. capacity of the respective motors are commensurate with the relative pressures impressed on the axles driven thereby, and as the pressure impressed on the intermediate axles is greater than the pressures impressed on the end axles the H. P. capacity of the motors 2 for driving the intermediate axles is greater than the H. P. capacity of the motor 1 for driving the end axles. The control system for operating the motors of the embodiment of the invention according to the embodiment of Figure 1 of the drawing should preferably be such as to impress voltages of the same magnitude on all motors 1, 2 at all times—during starting and running speeds—in order that the tractive efforts exerted may be commensurate with the pressures exerted on the respective axles.

All of the motors, 1, 2, may, however, be of the same H. P. capacity and when so employed it is necessary that the voltages applied to the respective motors during the starting and other accelerating periods differ in correspondence with the differences in the load pressures exerted on the respective axles driven thereby, i. e., that the voltages impressed on the motors 1 during such periods shall be lower than the voltage impressed on the motors 2. To accomplish this result a controller of any of the well known suitable types may be employed with connections such as shown in Figure 2 of the drawing, which illustrates a supply transformer 4 having a primary winding connected through a pantograph trolley 5 with trolley feeder 7 and ground, and a secondary winding having an end terminal also connected with ground. As shown the secondary winding of the transformer is provided with a plurality of taps connected respectively with contactors 8 to 11, inclusive, and therethrough to one or another of the outer terminals of a protective reactance 12 such as is usually employed. The reactance 12 has a midtap 13 connected to one terminal of each of the motors 2 and therethrough to ground. As further shown, the motors 1 are connected through a reactance 14 in parallel with motors 2 between the midtap 13 and ground.

In operation, the contactors, beginning with contactor 8, are successively closed and opened up to and including the closure of contactor 11, thereby impressing successively increasing voltages on the motors 2 corresponding in magnitude to the respective taps of the secondary winding of the transformer 4, less the voltage drop across one half of the reactance 12, and impressing on the motors 1 voltages corresponding to the voltages impressed on the motors 2 less the voltage drop across the reactance 14. Thus the respective motors 1 and 2 are, as is usual, started on low voltage which is gradually increased up to the maximum as determined by closure of contactor 11 and the opening of contactor 10.

In order, however, that the capacity of the motors 1 may be utilized up to the limits of the adhesion during the running periods, a contactor 15 is provided which may be closed to short circuit the reactance 14 simultaneously with and by the same means as employed for closure of any one or all of the contactors 8 and 11, inclusive, or otherwise, during such times as the load conditions will permit or justify.

Although a controller of the electro-magnetically actuated contactor type is indicated in the drawing, it will be obvious to those skilled in the art that hand or motor actuated controllers, such as the cam or drum types are equally adaptable for effecting the illustrated and described connections of the respective motors; and that although but two embodiments of the invention have been described it is apparent that a greater or lesser number of driving axles and motors may be employed, as well as other modifications, without departing from the spirit and scope thereof as defined in the appended claims.

The invention claimed is:

1. In combination with an electric vehicle having a plurality of driving axles journaled in a non-swiveling frame in such manner as to subject the intermediate ones of said axles to greater load pressures than the load pressures exerted on the end ones of said axles, of means for exerting a materially greater driving torque on the said intermediate ones of said axles than the driving torques exerted on the end ones of said axles whereby the guiding of said vehicle is facilitated during propulsion thereof.

2. In combination with an electric vehicle having a plurality of driving axles journaled in a non-swiveling frame in such manner as to subject the intermediate ones of said axles to greater load pressures than the load pressures exerted on the end ones of said axles, of motors for driving each of said axles, and means for causing the motors for driving the intermediate ones of said axles to exert a materially greater driving torque thereon than the driving torques exerted on the end ones of said axles by the motors for driving the latter of said axles whereby the guiding of said vehicle is facilitated during propulsion thereof.

3. In combination with an electric vehicle having a plurality of driving axles journaled in a single frame in such manner as to subject the intermediate ones of said axles to greater load pressures than the load pressures exerted on the end ones of said axles, of motors for driving each of said axles, the motors for driving the intermediate ones of said axles being of greater capacity than the capacity of the motors for driving the end ones of said axles whereby the intermediate ones of said axles are subjected to materially greater driving torques than the driving torques exerted on the end ones of said axles whereby the guiding of said vehicle is facilitated during propulsion thereof.

4. In combination with an electric vehicle having a plurality of driving axles journaled in a single frame in such manner as to subject the intermediate ones of said axles to greater load pressures than the load pressures exerted on the end ones of said axles, of motors for driving each of said axles, and means for impressing lower voltages on the motors for driving the end ones of said axles than the voltages impressed on the motors for driving the intermediate ones of said axles, whereby the driving torques exerted on the end ones of said axles are materially less than the driving torques exerted on the intermediate ones of said axles and the guiding of said vehicle thereby facilitated during propulsion thereof.

5. In combination with an electric vehicle having a plurality of driving axles journaled in a single frame in such manner as to subject the intermediate ones of said axles to greater load pressures than the pressures exerted on the end ones of said axles, of motors for driving each of said axles, means for impressing materially lower voltages on the motors for driving the end ones of said axles than the voltages impressed on the motors for driving the intermediate ones of said axles, and means for causing voltages of the same magnitude to be impressed on all of said motors whereby the guiding of said vehicle is facilitated during propulsion thereof.

6. In combination with an electric vehicle having a plurality of driving axles journaled in a single frame in such manner as to subject the intermediate ones of said axles to greater load pressures than the load pressures exerted on the end ones of said axles, of a plurality of motors of like capacity each coupled to and operable to drive a separate one of said axles, means for impressing materially lower voltages on the said ones of said motors coupled with the end ones of said axles than the voltages impressed on the said ones of said motors coupled with the said intermediate axles during periods of acceleration, and means for causing voltages of the same magnitude to be impressed on all of said motors to thereby exert the same driving torque to each of said axles whereby the guiding of said vehicle is facilitated during propulsion thereof.

WILHELM OERTEL.